United States Patent
Morris et al.

(10) Patent No.: US 9,216,704 B2
(45) Date of Patent: Dec. 22, 2015

(54) ELASTICALLY AVERAGED STRAP SYSTEMS AND METHODS

(71) Applicant: GM GLOBAL TECHNOLOGY OPERATIONS LLC, Detroit, MI (US)

(72) Inventors: Steven E. Morris, Fair Haven, MI (US); Jennifer P. Lawall, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 31 days.

(21) Appl. No.: 14/108,931

(22) Filed: Dec. 17, 2013

(65) Prior Publication Data

US 2015/0165986 A1  Jun. 18, 2015

(51) Int. Cl.

| | |
|---|---|
| *B60R 16/00* | (2006.01) |
| *B60R 16/02* | (2006.01) |
| *F16B 21/06* | (2006.01) |
| *B60R 21/20* | (2011.01) |
| *F16B 2/08* | (2006.01) |
| *F16B 5/06* | (2006.01) |

(52) U.S. Cl.
CPC ............. *B60R 16/0215* (2013.01); *B60R 21/20* (2013.01); *F16B 2/08* (2013.01); *F16B 21/065* (2013.01); *F16B 5/0621* (2013.01); *Y10T 24/1498* (2015.01); *Y10T 24/45005* (2015.01); *Y10T 29/49* (2015.01)

(58) Field of Classification Search
CPC ... B60R 16/0215; B60R 21/20; F16B 21/065; F16B 2/08; F16B 5/0621; Y10T 24/45005; Y10T 24/1498
See application file for complete search history.

(56) References Cited

U.S. PATENT DOCUMENTS

| | | |
|---|---|---|
| 1,219,398 A | 3/1917 | Huntsman |
| 1,261,036 A | 4/1918 | Kerns |
| 1,301,302 A | 4/1919 | Nolan |
| 1,556,233 A | 10/1925 | Maise |
| 1,819,126 A | 8/1931 | Scheibe |
| 1,929,848 A | 10/1933 | Neely |
| 1,968,168 A | 7/1934 | Place |

(Continued)

FOREIGN PATENT DOCUMENTS

| | | |
|---|---|---|
| CN | 1036250 A | 10/1989 |
| CN | 1129162 A | 8/1996 |

(Continued)

OTHER PUBLICATIONS

"Coupling Types—Elastic Averaging." MIT. Aug. 3, 2012, [online], [retrieved on Nov. 12, 2014]. Retrieved from the Internet <URL:https://web.archive.org/web/20120308055935/http://pergatory.mit.edu/kinematiccouplings/html/about/elastic_averaging.html>.

(Continued)

*Primary Examiner* — Faye M Fleming
(74) *Attorney, Agent, or Firm* — Cantor Colburn LLP

(57) ABSTRACT

In one aspect, an elastic averaging strap system for securing an object to a component having an aperture is provided. The system includes a strap having a first end and a second end. The strap second end couples to the strap first end such that the strap forms a loop around the object to retain the object therein. An alignment member extends from the first end, and the alignment member is an elastically deformable material such that when the alignment member is inserted into the component aperture, the alignment member elastically deforms to an elastically averaged final configuration to facilitate positioning the object in a desired orientation relative to the component.

13 Claims, 4 Drawing Sheets

(56) References Cited

U.S. PATENT DOCUMENTS

| | | | |
|---|---|---|---|
| 1,982,076 A | 11/1934 | Spahn | |
| 2,006,525 A | 7/1935 | Thal | |
| 2,267,558 A | 12/1941 | Birger et al. | |
| 2,275,103 A | 3/1942 | Gooch et al. | |
| 2,275,900 A | 3/1942 | Hall | |
| 2,482,488 A | 9/1949 | Franc | |
| 2,612,139 A | 9/1952 | Collins | |
| 2,688,894 A | 9/1954 | Modrey | |
| 2,707,607 A | 5/1955 | O'Connor | |
| 2,778,399 A | 1/1957 | Mroz | |
| 2,780,128 A | 2/1957 | Rapata | |
| 2,862,040 A | 11/1958 | Curran | |
| 2,902,902 A | 9/1959 | Slone | |
| 2,946,612 A | 7/1960 | Ahlgren | |
| 3,005,282 A | 10/1961 | Christiansen | |
| 3,014,563 A | 12/1961 | Bratton | |
| 3,087,352 A | 4/1963 | Daniel | |
| 3,089,269 A | 5/1963 | McKiernan | |
| 3,130,512 A | 4/1964 | Van Buren, Jr. | |
| 3,168,961 A | 2/1965 | Yates | |
| 3,169,004 A * | 2/1965 | Rapata | 248/71 |
| 3,169,439 A | 2/1965 | Rapata | |
| 3,188,731 A | 6/1965 | Sweeney | |
| 3,194,292 A | 7/1965 | Borowsky | |
| 3,213,189 A | 10/1965 | Mitchell et al. | |
| 3,230,592 A | 1/1966 | Hosea | |
| 3,233,358 A | 2/1966 | Dehm | |
| 3,233,503 A | 2/1966 | Birger | |
| 3,244,057 A | 4/1966 | Mathison | |
| 3,248,995 A | 5/1966 | Meyer | |
| 3,291,495 A | 12/1966 | Liebig | |
| 3,310,929 A | 3/1967 | Garvey | |
| 3,413,752 A | 12/1968 | Perry | |
| 3,473,283 A | 10/1969 | Meyer | |
| 3,531,850 A | 10/1970 | Durand | |
| 3,643,968 A | 2/1972 | Horvath | |
| 3,680,272 A | 8/1972 | Meyer | |
| 3,842,565 A | 10/1974 | Brown et al. | |
| 3,845,961 A | 11/1974 | Byrd, III | |
| 3,847,492 A | 11/1974 | Kennicutt et al. | |
| 3,895,408 A | 7/1975 | Leingang | |
| 3,905,570 A | 9/1975 | Nieuwveld | |
| 3,972,550 A | 8/1976 | Boughton | |
| 4,035,874 A | 7/1977 | Liljendahl | |
| 4,039,215 A | 8/1977 | Minhinnick | |
| 4,042,307 A | 8/1977 | Jarvis | |
| 4,043,585 A | 8/1977 | Yamanaka | |
| 4,158,511 A | 6/1979 | Herbenar | |
| 4,169,297 A | 10/1979 | Weihrauch | |
| 4,213,675 A | 7/1980 | Pilhall | |
| 4,237,573 A | 12/1980 | Weihrauch | |
| 4,300,851 A | 11/1981 | Thelander | |
| 4,313,609 A | 2/1982 | Clements | |
| 4,318,208 A | 3/1982 | Borja | |
| 4,325,574 A | 4/1982 | Umemoto et al. | |
| 4,363,839 A | 12/1982 | Watanabe et al. | |
| 4,364,150 A | 12/1982 | Remington | |
| 4,384,803 A | 5/1983 | Cachia | |
| 4,394,853 A | 7/1983 | Lopez-Crevillen et al. | |
| 4,406,033 A | 9/1983 | Chisholm et al. | |
| 4,477,142 A | 10/1984 | Cooper | |
| 4,481,160 A | 11/1984 | Bree | |
| 4,575,060 A | 3/1986 | Kitagawa | |
| 4,605,575 A | 8/1986 | Auld et al. | |
| 4,616,951 A | 10/1986 | Maatela | |
| 4,648,649 A | 3/1987 | Beal | |
| 4,654,760 A | 3/1987 | Matheson et al. | |
| 4,745,656 A | 5/1988 | Revlett | |
| 4,767,647 A | 8/1988 | Bree | |
| 4,805,272 A | 2/1989 | Yamaguchi | |
| 4,807,335 A | 2/1989 | Candea | |
| 4,817,999 A | 4/1989 | Drew | |
| 4,819,983 A | 4/1989 | Alexander et al. | |
| 4,881,764 A | 11/1989 | Takahashi et al. | |
| 4,973,212 A | 11/1990 | Jacobs | |
| 4,977,648 A | 12/1990 | Eckerud | |
| 5,139,285 A | 8/1992 | Lasinski | |
| 5,154,479 A | 10/1992 | Sautter, Jr. | |
| 5,170,985 A | 12/1992 | Killworth et al. | |
| 5,180,219 A | 1/1993 | Geddie | |
| 5,208,507 A | 5/1993 | Jung | |
| 5,212,853 A | 5/1993 | Kaneko | |
| 5,234,122 A | 8/1993 | Cherng | |
| 5,297,322 A | 3/1994 | Kraus | |
| 5,342,139 A | 8/1994 | Hoffman | |
| 5,368,797 A | 11/1994 | Quentin et al. | |
| 5,397,206 A | 3/1995 | Sihon | |
| 5,446,965 A | 9/1995 | Makridis | |
| 5,507,610 A | 4/1996 | Benedetti et al. | |
| 5,513,603 A | 5/1996 | Ang et al. | |
| 5,524,786 A | 6/1996 | Skudlarek | |
| 5,538,079 A | 7/1996 | Pawlick | |
| 5,556,808 A | 9/1996 | Williams et al. | |
| 5,575,601 A | 11/1996 | Skufca | |
| 5,577,301 A | 11/1996 | Demaagd | |
| 5,577,779 A | 11/1996 | Dangel | |
| 5,580,204 A | 12/1996 | Hultman | |
| 5,586,372 A | 12/1996 | Eguchi et al. | |
| 5,601,453 A | 2/1997 | Horchler | |
| 5,634,757 A | 6/1997 | Schanz | |
| 5,657,516 A | 8/1997 | Berg et al. | |
| 5,667,271 A | 9/1997 | Booth | |
| 5,670,013 A | 9/1997 | Huang et al. | |
| 5,698,276 A | 12/1997 | Mirabitur | |
| 5,736,221 A | 4/1998 | Hardigg et al. | |
| 5,765,942 A | 6/1998 | Shirai et al. | |
| 5,795,118 A | 8/1998 | Osada et al. | |
| 5,797,170 A | 8/1998 | Akeno | |
| 5,803,646 A | 9/1998 | Weihrauch | |
| 5,806,915 A | 9/1998 | Takabatake | |
| 5,810,535 A | 9/1998 | Fleckenstein et al. | |
| 5,820,292 A | 10/1998 | Fremstad | |
| 5,846,631 A | 12/1998 | Nowosiadly | |
| 5,941,673 A | 8/1999 | Hayakawa et al. | |
| 6,073,315 A * | 6/2000 | Rasmussen | 24/16 PB |
| 6,095,594 A | 8/2000 | Riddle et al. | |
| 6,164,603 A | 12/2000 | Kawai | |
| 6,193,430 B1 | 2/2001 | Culpepper et al. | |
| 6,202,962 B1 | 3/2001 | Snyder | |
| 6,209,175 B1 | 4/2001 | Gershenson | |
| 6,209,178 B1 | 4/2001 | Wiese et al. | |
| 6,264,869 B1 | 7/2001 | Notarpietro et al. | |
| 6,299,478 B1 | 10/2001 | Jones et al. | |
| 6,321,495 B1 | 11/2001 | Oami | |
| 6,349,904 B1 * | 2/2002 | Polad | 248/74.3 |
| 6,354,815 B1 | 3/2002 | Svihla et al. | |
| 6,378,931 B1 | 4/2002 | Kolluri et al. | |
| 6,398,449 B1 | 6/2002 | Loh | |
| 6,484,370 B2 | 11/2002 | Kanie et al. | |
| 6,485,241 B1 | 11/2002 | Oxford | |
| 6,523,817 B1 | 2/2003 | Landry, Jr. | |
| 6,533,391 B1 | 3/2003 | Pan | |
| 6,543,979 B2 | 4/2003 | Iwatsuki | |
| 6,557,260 B1 | 5/2003 | Morris | |
| 6,568,701 B1 | 5/2003 | Burdack et al. | |
| 6,579,397 B1 | 6/2003 | Spain et al. | |
| 6,591,801 B1 | 7/2003 | Fonville | |
| 6,609,717 B2 | 8/2003 | Hinson | |
| 6,658,698 B2 | 12/2003 | Chen | |
| 6,662,411 B2 | 12/2003 | Rubenstein | |
| 6,664,470 B2 | 12/2003 | Nagamoto | |
| 6,677,065 B2 | 1/2004 | Blauer | |
| 6,692,016 B2 | 2/2004 | Yokota | |
| 6,712,329 B2 | 3/2004 | Ishigami et al. | |
| 6,746,172 B2 | 6/2004 | Culpepper | |
| 6,799,758 B2 | 10/2004 | Fries | |
| 6,840,969 B2 | 1/2005 | Kobayashi et al. | |
| 6,857,676 B2 | 2/2005 | Kawaguchi et al. | |
| 6,857,809 B2 | 2/2005 | Granata | |
| 6,908,117 B1 | 6/2005 | Pickett, Jr. et al. | |
| 6,932,416 B2 | 8/2005 | Clauson | |
| 6,948,753 B2 | 9/2005 | Yoshida et al. | |
| 6,951,349 B2 | 10/2005 | Yokota | |
| 6,959,954 B2 | 11/2005 | Brandt et al. | |

(56) References Cited

U.S. PATENT DOCUMENTS

| | | |
|---|---|---|
| 6,966,601 B2 | 11/2005 | Matsumoto et al. |
| 6,971,831 B2 | 12/2005 | Fattori et al. |
| 6,997,487 B2 | 2/2006 | Kitzis |
| 7,000,941 B2 | 2/2006 | Yokota |
| 7,008,003 B1 | 3/2006 | Hirose et al. |
| 7,014,094 B2 | 3/2006 | Alcoe |
| 7,017,239 B2 | 3/2006 | Kurily et al. |
| 7,036,779 B2 | 5/2006 | Kawaguchi et al. |
| 7,055,849 B2 | 6/2006 | Yokota |
| 7,059,628 B2 | 6/2006 | Yokota |
| 7,073,260 B2 | 7/2006 | Jensen |
| 7,089,998 B2 | 8/2006 | Crook |
| 7,097,198 B2 | 8/2006 | Yokota |
| 7,121,611 B2 | 10/2006 | Hirotani et al. |
| 7,144,183 B2 | 12/2006 | Lian et al. |
| 7,172,210 B2 | 2/2007 | Yokota |
| 7,178,855 B2 | 2/2007 | Catron et al. |
| 7,198,315 B2 | 4/2007 | Cass et al. |
| 7,234,852 B2 | 6/2007 | Nishizawa et al. |
| 7,306,418 B2 | 12/2007 | Kornblum |
| 7,322,500 B2 | 1/2008 | Maierholzner |
| 7,344,056 B2 | 3/2008 | Shelmon et al. |
| 7,360,964 B2 | 4/2008 | Tsuya |
| 7,369,408 B2 | 5/2008 | Chang |
| 7,435,031 B2 | 10/2008 | Granata |
| 7,454,105 B2 | 11/2008 | Yi |
| 7,487,884 B2 | 2/2009 | Kim |
| 7,493,716 B2 | 2/2009 | Brown |
| 7,557,051 B2 | 7/2009 | Ryu et al. |
| 7,568,316 B2 | 8/2009 | Choby et al. |
| D602,349 S | 10/2009 | Andersson |
| 7,672,126 B2 | 3/2010 | Yeh |
| 7,677,650 B2 | 3/2010 | Huttenlocher |
| 7,764,853 B2 | 7/2010 | Yi |
| 7,793,998 B2 | 9/2010 | Matsui et al. |
| 7,802,831 B2 | 9/2010 | Isayama et al. |
| 7,828,372 B2 | 11/2010 | Ellison |
| 7,862,272 B2 | 1/2011 | Nakajima |
| 7,869,003 B2 | 1/2011 | Van Doren et al. |
| 7,883,137 B2 | 2/2011 | Bar |
| 7,922,415 B2 | 4/2011 | Rudduck et al. |
| 7,946,684 B2 | 5/2011 | Drury et al. |
| 8,029,222 B2 | 10/2011 | Nitsche |
| 8,061,861 B2 | 11/2011 | Paxton et al. |
| 8,101,264 B2 | 1/2012 | Pace et al. |
| 8,136,819 B2 | 3/2012 | Yoshitsune et al. |
| 8,162,375 B2 | 4/2012 | Gurtatowski et al. |
| 8,203,496 B2 | 6/2012 | Miller et al. |
| 8,203,843 B2 | 6/2012 | Chen |
| 8,261,581 B2 | 9/2012 | Cerruti et al. |
| 8,276,961 B2 | 10/2012 | Kwolek |
| 8,297,137 B2 | 10/2012 | Dole |
| 8,297,661 B2 | 10/2012 | Proulx et al. |
| 8,414,048 B1 | 4/2013 | Kwolek |
| 8,444,199 B2 | 5/2013 | Takeuchi et al. |
| 8,677,573 B2 | 3/2014 | Lee |
| 8,695,201 B2 | 4/2014 | Morris |
| 8,720,016 B2 | 5/2014 | Beaulieu |
| 8,726,473 B2 | 5/2014 | Dole |
| 8,826,499 B2 | 9/2014 | Tempesta |
| 8,833,832 B2 | 9/2014 | Whipps |
| 8,834,058 B2 | 9/2014 | Woicke |
| 9,039,318 B2 | 5/2015 | Mantei et al. |
| 9,050,690 B2 | 6/2015 | Hammer et al. |
| 9,061,715 B2 | 6/2015 | Morris |
| 9,067,625 B2 | 6/2015 | Morris |
| 2001/0030414 A1 | 10/2001 | Yokota |
| 2001/0045757 A1 | 11/2001 | Kanie et al. |
| 2002/0045086 A1 | 4/2002 | Tsuji et al. |
| 2002/0060275 A1* | 5/2002 | Polad .................... 248/74.3 |
| 2002/0092598 A1 | 7/2002 | Jones et al. |
| 2002/0136617 A1 | 9/2002 | Imahigashi |
| 2003/0007831 A1 | 1/2003 | Lian et al. |
| 2003/0080131 A1 | 5/2003 | Fukuo |
| 2003/0082986 A1 | 5/2003 | Wiens et al. |
| 2003/0087047 A1 | 5/2003 | Blauer |
| 2003/0108401 A1 | 6/2003 | Agha et al. |
| 2003/0180122 A1 | 9/2003 | Dobson |
| 2004/0037637 A1 | 2/2004 | Lian et al. |
| 2004/0131896 A1 | 7/2004 | Blauer |
| 2004/0139678 A1 | 7/2004 | Pervan |
| 2004/0140651 A1 | 7/2004 | Yokota |
| 2004/0208728 A1 | 10/2004 | Fattori et al. |
| 2005/0016116 A1 | 1/2005 | Scherff |
| 2005/0031946 A1 | 2/2005 | Kruger et al. |
| 2005/0054229 A1 | 3/2005 | Tsuya |
| 2005/0082449 A1 | 4/2005 | Kawaguchi et al. |
| 2005/0156409 A1 | 7/2005 | Yokota |
| 2005/0156410 A1 | 7/2005 | Yokota |
| 2005/0156416 A1 | 7/2005 | Yokota |
| 2005/0244250 A1 | 11/2005 | Okada et al. |
| 2006/0102214 A1 | 5/2006 | Clemons |
| 2006/0110109 A1 | 5/2006 | Yu |
| 2006/0113755 A1 | 6/2006 | Yokota |
| 2006/0141318 A1 | 6/2006 | MacKinnon et al. |
| 2006/0197356 A1 | 9/2006 | Catron et al. |
| 2006/0202449 A1 | 9/2006 | Yokota |
| 2006/0237995 A1 | 10/2006 | Huttenlocher |
| 2006/0249520 A1 | 11/2006 | Demonte |
| 2006/0264076 A1 | 11/2006 | Chen |
| 2007/0040411 A1 | 2/2007 | Dauvergne |
| 2007/0113483 A1 | 5/2007 | Hernandez |
| 2007/0113485 A1 | 5/2007 | Hernandez |
| 2007/0126211 A1* | 6/2007 | Moerke et al. ............ 280/728.2 |
| 2007/0144659 A1 | 6/2007 | De La Fuente |
| 2007/0292205 A1 | 12/2007 | Duval |
| 2008/0014508 A1 | 1/2008 | Van Doren et al. |
| 2008/0018128 A1 | 1/2008 | Yamagiwa et al. |
| 2008/0073888 A1 | 3/2008 | Enriquez |
| 2008/0094447 A1 | 4/2008 | Drury et al. |
| 2008/0128346 A1 | 6/2008 | Bowers |
| 2008/0217796 A1 | 9/2008 | Van Bruggen et al. |
| 2008/0260488 A1 | 10/2008 | Scroggie et al. |
| 2009/0028506 A1 | 1/2009 | Yi et al. |
| 2009/0072591 A1 | 3/2009 | Baumgartner |
| 2009/0091156 A1 | 4/2009 | Neubrand |
| 2009/0134652 A1 | 5/2009 | Araki |
| 2009/0141449 A1 | 6/2009 | Yeh |
| 2009/0174207 A1 | 7/2009 | Lota |
| 2009/0265896 A1* | 10/2009 | Beak .............................. 24/270 |
| 2010/0001539 A1 | 1/2010 | Kikuchi et al. |
| 2010/0021267 A1 | 1/2010 | Nitsche |
| 2010/0061045 A1 | 3/2010 | Chen |
| 2010/0102538 A1 | 4/2010 | Paxton et al. |
| 2010/0134128 A1 | 6/2010 | Hobbs |
| 2010/0147355 A1 | 6/2010 | Shimizu et al. |
| 2010/0247034 A1 | 9/2010 | Yi et al. |
| 2010/0270745 A1 | 10/2010 | Hurlbert et al. |
| 2011/0012378 A1 | 1/2011 | Ueno et al. |
| 2011/0076588 A1 | 3/2011 | Yamaura |
| 2011/0119875 A1 | 5/2011 | Iwasaki |
| 2011/0131918 A1 | 6/2011 | Glynn |
| 2011/0175376 A1 | 7/2011 | Whitens et al. |
| 2011/0207024 A1 | 8/2011 | Bogumil et al. |
| 2011/0239418 A1 | 10/2011 | Huang |
| 2011/0296764 A1 | 12/2011 | Sawatani et al. |
| 2011/0311332 A1 | 12/2011 | Ishman |
| 2012/0020726 A1 | 1/2012 | Jan |
| 2012/0073094 A1 | 3/2012 | Bishop |
| 2012/0115010 A1 | 5/2012 | Smith et al. |
| 2012/0240363 A1 | 9/2012 | Lee |
| 2012/0251226 A1 | 10/2012 | Liu et al. |
| 2012/0261951 A1 | 10/2012 | Mildner et al. |
| 2012/0321379 A1 | 12/2012 | Wang et al. |
| 2013/0019454 A1 | 1/2013 | Colombo et al. |
| 2013/0019455 A1 | 1/2013 | Morris |
| 2013/0027852 A1 | 1/2013 | Wang |
| 2013/0071181 A1 | 3/2013 | Herzinger et al. |
| 2013/0157015 A1 | 6/2013 | Morris |
| 2013/0212858 A1 | 8/2013 | Herzinger et al. |
| 2013/0269873 A1 | 10/2013 | Herzinger et al. |
| 2013/0287992 A1 | 10/2013 | Morris |
| 2014/0033493 A1 | 2/2014 | Morris et al. |
| 2014/0041176 A1 | 2/2014 | Morris |

(56) References Cited

U.S. PATENT DOCUMENTS

| | | |
|---|---|---|
| 2014/0041185 A1 | 2/2014 | Morris et al. |
| 2014/0041199 A1 | 2/2014 | Morris |
| 2014/0042704 A1 | 2/2014 | Polewarczyk |
| 2014/0047691 A1 | 2/2014 | Colombo et al. |
| 2014/0047697 A1 | 2/2014 | Morris |
| 2014/0080036 A1 | 3/2014 | Smith et al. |
| 2014/0132023 A1 | 5/2014 | Watanabe |
| 2014/0157578 A1 | 6/2014 | Morris et al. |
| 2014/0159412 A1 | 6/2014 | Morris et al. |
| 2014/0175774 A1 | 6/2014 | Kansteiner |
| 2014/0202628 A1 | 7/2014 | Sreetharan et al. |
| 2014/0208561 A1 | 7/2014 | Colombo et al. |
| 2014/0208572 A1 | 7/2014 | Colombo et al. |
| 2014/0220267 A1 | 8/2014 | Morris et al. |
| 2014/0292013 A1 | 10/2014 | Colombo et al. |
| 2014/0298638 A1 | 10/2014 | Colombo et al. |
| 2014/0298640 A1 | 10/2014 | Morris et al. |
| 2014/0298962 A1 | 10/2014 | Morris et al. |
| 2014/0300130 A1 | 10/2014 | Morris et al. |
| 2014/0301103 A1 | 10/2014 | Colombo et al. |
| 2014/0301777 A1 | 10/2014 | Morris et al. |
| 2014/0301778 A1 | 10/2014 | Morris et al. |
| 2014/0360824 A1 | 12/2014 | Morris et al. |
| 2014/0360826 A1 | 12/2014 | Morris et al. |
| 2014/0366326 A1 | 12/2014 | Colombo et al. |
| 2014/0369742 A1 | 12/2014 | Morris et al. |
| 2014/0369743 A1 | 12/2014 | Morris et al. |
| 2015/0016864 A1 | 1/2015 | Morris et al. |
| 2015/0016918 A1 | 1/2015 | Colombo |
| 2015/0023724 A1 | 1/2015 | Morris et al. |
| 2015/0050068 A1 | 2/2015 | Morris et al. |
| 2015/0069779 A1 | 3/2015 | Morris et al. |
| 2015/0078805 A1 | 3/2015 | Morris et al. |

FOREIGN PATENT DOCUMENTS

| | | |
|---|---|---|
| CN | 1205285 A | 1/1999 |
| CN | 1328521 A | 12/2001 |
| CN | 1426872 A | 7/2003 |
| CN | 2661972 Y | 12/2004 |
| CN | 1670986 A | 9/2005 |
| CN | 100573975 C | 9/2005 |
| CN | 1693721 A | 11/2005 |
| CN | 1771399 A | 5/2006 |
| CN | 1774580 A | 5/2006 |
| CN | 2888807 Y | 4/2007 |
| CN | 2915389 Y | 6/2007 |
| CN | 101250964 A | 4/2008 |
| CN | 201259846 Y | 6/2009 |
| CN | 201268336 Y | 7/2009 |
| CN | 201310827 Y | 9/2009 |
| CN | 201540513 U | 8/2010 |
| CN | 101821534 | 9/2010 |
| CN | 201703439 U | 1/2011 |
| CN | 201737062 U | 2/2011 |
| CN | 201792722 U | 4/2011 |
| CN | 201890285 U | 7/2011 |
| CN | 102144102 A | 8/2011 |
| CN | 202079532 U | 12/2011 |
| CN | 102313952 A | 1/2012 |
| CN | 102756633 | 10/2012 |
| CN | 202686206 U | 1/2013 |
| DE | 1220673 B | 7/1966 |
| DE | 2736012 A1 | 2/1978 |
| DE | 3704190 A1 | 12/1987 |
| DE | 3711696 A1 | 10/1988 |
| DE | 3805693 A1 | 2/1989 |
| DE | 3815927 | 11/1989 |
| DE | 9109276 U1 | 7/1991 |
| DE | 4002443 A1 | 8/1991 |
| DE | 4111245 A1 | 10/1991 |
| DE | 9201258 U1 | 3/1992 |
| DE | 29714892 U1 | 10/1997 |
| DE | 29800379 U1 | 5/1998 |
| DE | 69600357 T2 | 12/1998 |
| DE | 10234253 B3 | 4/2004 |
| DE | 102008005618 A1 | 7/2009 |
| DE | 102010028323 A1 | 11/2011 |
| DE | 102011050003 A1 | 10/2012 |
| DE | 102012212101 B3 | 7/2013 |
| EP | 0118796 | 9/1984 |
| EP | 1132263 A1 | 9/2001 |
| EP | 1273766 A1 | 1/2003 |
| EP | 1293384 A2 | 3/2003 |
| EP | 1384536 A2 | 1/2004 |
| EP | 1388449 A1 | 2/2004 |
| EP | 2166235 A2 | 3/2010 |
| EP | 2450259 A1 | 5/2012 |
| EP | 2458454 A1 | 5/2012 |
| FR | 1369198 A | 8/1964 |
| FR | 2009941 A1 | 2/1970 |
| FR | 2750177 A2 | 12/1997 |
| FR | 2958696 A1 | 10/2011 |
| GB | 2281950 A | 3/1995 |
| JP | 2001171554 A | 6/2001 |
| JP | 2005268004 | 9/2005 |
| JP | 2006205918 | 8/2006 |
| JP | 2008307938 A | 12/2008 |
| JP | 2009084844 | 4/2009 |
| JP | 2009187789 A | 8/2009 |
| WO | 2008140659 A1 | 11/2008 |
| WO | 2013191622 A1 | 12/2013 |

OTHER PUBLICATIONS

"Elastic Averaging in Flexture Mechanisms: A Multi-Beam Paralleaogram Flexture Case-Study" by Shorya Awtar and Edip Sevincer, Proceedings of IDETC/CIE 2006, Paper DETC2006-99752, American Society of Mechanical Engineers (ASME), Sep. 2006.

"An Anti Backlash Two-Part Shaft Coupling With Interlocking Elastically Averaged Teeth" by Mahadevan Balasubramaniam, Edmund Golaski, Seung-Kil Son, Krishnan Sriram, and Alexander Slocum, Precision Engineering, V. 26, No. 3, Elsevier Publishing, Jul. 2002.

"The Design of High Precision Parallel Mechnisms Using Binary Actuation and Elastic Averaging: With Application to MRI Cancer Treatment" by L.M. Devita, J.S. Plante, and S. Dubowsky, 12th IFToMM World Congress (France), Jun. 2007.

"Passive Alignment of Micro-Fluidic Chips Using the Principle of Elastic Averaging" by Sitanshu Gurung, Thesis, Louisiana State University, Dept. of Mechanical Engineering, Dec. 2007.

"Precision Connector Assembly Using Elastic Averaging" by Patrick J. Willoughby and Alexander H. Slocum, Massachusetts Institute of Technology (MIT), Cambridge, MA, American Society for Precision Engineering, 2004.

U.S. Appl. No. 13/229,926, filed Sep. 12, 2011, entitled "Using Elastic Averaging for Alignment of Battery Stack, Fuel Cell Stack, or Other Vehicle Assembly", inventors: Mark A. Smith, Ronald Daul, Xiang Zhao, David Okonski, Elmer Santos, Lane Lindstrom, and Jeffrey A. Abell.

U.S. Appl. No. 13/330,718, filed Dec. 20, 2011, entitled "Precisely Locating Components in an Infrared Welded Assembly", inventor: Steven E. Morris.

U.S. Appl. No. 13/459,118, filed Apr. 28, 2012, entitled "Stiffened Multi-Layer Compartment Door Assembly Utilizing Elastic Averaging," inventor: Steven E. Morris.

U.S. Appl. No. 13/567,580, filed Aug. 6, 2012, entitled "Semi-Circular Alignment Features of an Elastic Averaging Alignment System", inventors: Steven E. Morris and Thomas F. Bowles.

U.S. Appl. No. 13/570,959, filed Aug. 9, 2012, entitled "Elastic Cantilever Beam Alignment System for Precisely Aligning Components", inventor: Steven E. Morris.

U.S. Appl. No. 13/571,030, filed Aug. 9, 2012, entitled "Elastic Tube Alignment System for Precisely Locating an Emblem Lens to an Outer Bezel", inventors: Joel Colombo, Steven E. Morris, and Michael D. Richardson.

U.S. Appl. No. 13/752,449, filed Jan. 29, 2013, entitled "Elastic Insert Alignment Assembly and Method of Reducing Positional Variation", inventors: Steven E. Morris and Michael D. Richardson.

(56) References Cited

OTHER PUBLICATIONS

U.S. Appl. No. 13/755,759, filed Jan. 31, 2013, entitled "Elastic Alignment Assembly for Aligning Mated Components and Method of Reducing Positional Variation", inventors: Joel Colombo, Michael D. Richardson, and Steven E. Morris.
U.S. Appl. No. 13/851,222, filed Mar. 27, 2013, entitled "Elastically Averaged Alignment System", inventors: Joel Colombo and Steven E Morris.
U.S. Appl. No. 13/855,928, filed Apr. 3, 2013, entitled "Elastic Averaging Alignment System, Method of Making the Same and Cutting Punch Therefor", inventors: Steven E. Morris, Jennifer P. Lawall, Joel Colombo, and Jeffrey L. Konchan.
U.S. Appl. No. 13/856,888, filed Apr. 4, 2013, entitled "Elastic Retaining Assembly for Matable Components and Method of Assembling", inventors: Steven E. Morris, Jennifer P. Lawall, Joel Colombo, and Toure D. Lee.
U.S. Appl. No. 13/856,927, filed Apr. 4, 2013, entitled "Elastic Tubular Attachment Assembly for Mating Components and Method of Mating Components", inventors: Steven E. Morris and Jennifer P. Lawall.
U.S. Appl. No. 13/856,956, filed Apr. 4, 2013, entitled "Elastic Clip Retaining Arrangement and Method of Mating Structures with an Elastic Clip Retaining Arrangement", inventors: Joel Colombo, Steven E. Morris and Jeffrey L. Konchan.
U.S. Appl. No. 13/856,973, filed Apr. 4, 2013, entitled "Elastically Deformable Flange Locator Arrangement and Method of Reducing Positional Variation", inventors: Joel Colombo, Steven E. Morris and Michael D. Richardson.
U.S. Appl. No. 13/858,478, filed Apr. 8, 2013, entitled "Elastic Mating Assembly and Method of Elastically Assembling Matable Components", inventors: Steven E. Morris and Jennifer P. Lawall.
U.S. Appl. No. 13/859,109, filed Apr. 9, 2013, entitled "Elastic Retaining Arrangement for Jointed Components and Method of Reducing a Gap Between Jointed Components," inventors: Steven E. Morris, James M. Kushner, Victoria L. Enyedy, Jennifer P. Lawall, and Piotr J. Ogonek.
U.S. Appl. No. 13/915,132, filed Jun. 11, 2013, entitled "Elastically Deformable Energy Management Arrangement and Method of Managing Energy Absorption," inventors: Steven E. Morris, Randy A. Johnson and Jennifer P. Lawall.
U.S. Appl. No. 13/915,177, filed Jun. 11, 2013, entitled "Elastically Deformable Energy Management Assembly and Method of Managing Energy Absorption," inventors: Steven E. Morris, Jennifer P. Lawall, and Randy Johnson.
U.S. Appl. No. 13/917,005, filed Jun. 13, 2013, entitled "Elastic Attachment Assembly and Method of Reducing Positional Variation and Increasing Stiffness," inventors: Steven E. Morris and Jennifer P. Lawall.
U.S. Appl. No. 13/917,074, filed Jun. 13, 2013, entitled "Elastically Deformable Retaining Hook for Components to be Mated Together and Method of Assembling", inventors: Joel Colombo, Jeffrey L. Konchan, Steven E. Morris, and Steve J. Briggs.
U.S. Appl. No. 13/918,183, filed Jun. 14, 2013, entitled "Elastic Retaining Assembly for Matable Components and Method of Assembling," inventors: Steven E. Morris and Jennifer P. Lawall.
U.S. Appl. No. 13/939,503, filed Jul. 11, 2013, entitled "Elastically Averaged Alignment Systems and Methods," inventor: Joel Colombo.
U.S. Appl. No. 13/940,912, filed Jul. 12, 2013, entitled "Alignment Arrangement for Mated Components and Method", inventors: Steven E. Morris and Jennifer P. Lawall.
U.S. Appl. No. 13/945,231, filed Jul. 18, 2013, entitled "Lobular Elastic Tube Alignment System for Providing Precise Four-Way Alignment of Components", Inventors: Steven E. Morris and Jennifer P. Lawall.
U.S. Appl. No. 13/954,198, filed Jul. 30, 2013, entitled "Elastic Alignment and Retention System and Method," inventors: Steven E. Morris, Edward D. Groninger, and Raymond J. Chess.

U.S. Appl. No. 13/966,523, filed Aug. 14, 2013, entitled "Elastically Averaged Alignment Systems and Methods Thereof," inventors: Steven E. Morris, Jennifer P. Lawall and Joel Colombo.
U.S. Appl. No. 13/973,587, filed Aug. 22, 2013, entitled "Elastic Averaging Alignment System and Method," inventors: Steven E. Morris and Jennifer P. Lawall.
U.S. Appl. No. 13/974,729, filed Aug. 23, 2013, entitled "Elastic Averaging Snap Member Aligning and Fastening System", inventors: Steven E. Morris and Jennifer P. Lawall.
U.S. Appl. No. 14/012,205, filed Aug. 28, 2013, entitled "Elastically Deformable Alignment Fastener and System," inventors: Steven E. Morris, Marc J. Tahnoose, Michael E. McGuire and Jennifer P. Lawall.
U.S. Appl. No. 14/021,282, filed Sep. 9, 2013, entitled "Elastic Tube Alignment and Fastening System for Providing Precise Alignment and Fastening of Components," inventors: Steven E. Morris and Jennifer P. Lawall.
U.S. Appl. No. 14/031,647, filed Sep. 19, 2013, entitled "Elastically Averaged Alignment Systems and Methods," inventors: Steven E. Morris, Joel Colombo, Jennifer P. Lawall, Jeffrey L. Konchan, and Steve J. Briggs.
U.S. Appl. No. 14/038,241, filed Sep. 26, 2013, entitled "Serviceable Aligning and Self-Retaining Elastic Arrangement for Mated Components and Method," inventors: Steven E. Morris, Jennifer P. Lawall and Joel Colombo.
U.S. Appl. No. 14/039,614, filed Sep. 27, 2013, entitled "Elastically Averaged Alignment Systems and Methods," inventor: Steven E. Morris.
U.S. Appl. No. 14/044,199, filed Oct. 2, 2013, entitled "Lobular Elastic Tube Alignment and Retention System for Providing Precise Alignment of Components," inventors: Steven E. Morris and Jennifer P. Lawall.
U.S. Appl. No. 14/044,207, filed Oct. 2, 2013, entitled "Elastic Aperture Alignment System for Providing Precise Four-Way Alignment of Components," inventors: Steven E. Morris and Jennifer P. Lawall.
U.S. Appl. No. 14/045,463, filed Oct. 3, 2013, entitled "Elastically Averaged Alignment Systems and Methods," inventors: Steven E. Morris and Jennifer P. Lawall.
U.S. Appl. No. 14/081,361, filed Nov. 15, 2013, entitled "Elastically Deformable Clip and Method," inventors: Steven E. Morris, Jennifer P. Lawall and Jeffrey M. Gace.
U.S. Appl. No. 14/104,321, filed Dec. 12, 2013, entitled "Alignment and Retention System for a Flexible Assembly," inventors: Steven E. Morris and Jennifer P. Lawall.
U.S. Appl. No. 14/104,327, filed Dec. 12, 2013, entitled "Self-Retaining Alignment System for Providing Precise Alignment and Retention of Components," inventors: Steven E. Morris, Jennifer P. Lawall and Toure D. Lee.
U.S. Appl. No. 14/104,333, filed Dec. 12, 2013, entitled "Alignment System for Providing Precise Alignment and Retention of Components of a Sealable Compartment," inventors: Steven E. Morris, Christopher J. Georgi, Jennifer P. Lawall and Gordan N. Noll.
U.S. Appl. No. 14/104,541, filed Dec. 12, 2013, entitled "Alignment and Retention System for Providing Precise Alignment and Retention of Components," inventors: Steven E. Morris and Jennifer P. Lawall.
U.S. Appl. No. 14/104,549, filed Dec. 12, 2013, entitled "Alignment System for Providing Alignment of Components Having Contoured Features," inventors: Steven E. Morris and Jennifer P. Lawall.
U.S. Appl. No. 14/108,921, filed Dec. 17, 2013, entitled "Elastically Averaged Alignment Systems and Methods Thereof," inventors: Steven E. Morris and Jennifer P. Lawall.
U.S. Appl. No. 14/108,931, filed Dec. 17, 2013, entitled "Elastically Averaged Strap Systems and Methods," inventors: Steven E. Morris and Jennifer P. Lawall.
U.S. Appl. No. 14/109,296, filed Dec. 17, 2013, entitled "Fastener for Operatively Coupling Matable Components," inventors: Steven E. Morris and Jennifer P. Lawall.
U.S. Appl. No. 14/134,622, filed Dec. 19, 2013, entitled "Elastic Averaging Alignment Member," inventors: Steven E. Morris and Jennifer P. Lawall.

(56) References Cited

OTHER PUBLICATIONS

U.S. Appl. No. 14/134,801, filed Dec. 19, 2013, entitled "Elastically Averaged Alignment Systems and Methods," inventors: Steven E. Morris and Jennifer P. Lawall.

U.S. Appl. No. 14/134,844, filed Dec. 19, 2013, entitled "Elastically Deformable Module Installation Assembly," inventors: Steven E. Morris and Jennifer P. Lawall.

U.S. Appl. No. 14/134,888, filed Dec. 19, 2013, entitled "Elastic Retaining Assembly and Method," inventors: Steven E. Morris and Jennifer P. Lawall.

U.S. Appl. No. 14/136,502, filed Dec. 20, 2013, entitled "Elastically Averaged Alignment Systems and Methods," inventors: Timothy A. Kiester, Steven E. Morris, Kenton L. West, Scott J. Fast, and Evan Phillips.

U.S. Appl. No. 14/151,279, filed Jan. 9, 2014, entitled "Elastically Averaged Alignment Systems and Methods," inventors: Steven E. Morris and Jennifer P. Lawall.

U.S. Appl. No. 14/153,741, filed Jan. 13, 2014, entitled "Elastically Averaged Assembly for Closure Applications," inventors: Steven E. Morris, Jeffrey A. Abell, Jennifer P. Lawall, and Jeffrey L. Konchan.

U.S. Appl. No. 14/180,882, filed Feb. 14, 2014, entitled "Elastic Tube Alignment System for Precisely Locating Components," inventor: Steven E. Morris.

U.S. Appl. No. 14/181,142, filed Feb. 14, 2014, entitled "Elastic Tube Alignment System for Precisely Locating Components," inventor: Steven E. Morris.

U.S. Appl. No. 14/185,422, filed Feb. 20, 2014, entitled "Elastically Averaged Alignment Systems and Methods," inventors: Joel Colombo, Steven E. Morris, Jennifer P. Lawall and Ashish M. Gollapalli.

U.S. Appl. No. 14/185,472, filed Feb. 20, 2014, entitled "Elastically Averaged Alignment Systems and Method," inventors: Steven E. Morris, Jennifer P. Lawall and Kee Hyuk Im.

U.S. Appl. No. 14/231,395, filed Mar. 31, 2014, entitled "Elastically Averaged Alignment Systems and Methods," inventors: Joel Colombo, Steven E. Morris, Jennifer P. Lawall, and Ashish M. Gollapalli.

U.S. Appl. No. 14/249,746, filed Apr. 10, 2014, entitled "Elastically Averaged Alignment Systems and Methods," inventors: Joel Colombo and Catherine A. Ostrander.

U.S. Appl. No. 14/259,747, filed Apr. 23, 2014, entitled "System for Elastically Averaging Assembly of Components," inventors: Steven E. Morris and Jennifer P. Lawall.

Cross-sectional view of a prior art infrared welded assembly of BMW, Munich, Germany. Believed on the market since about Jan. 1, 2010.

* cited by examiner

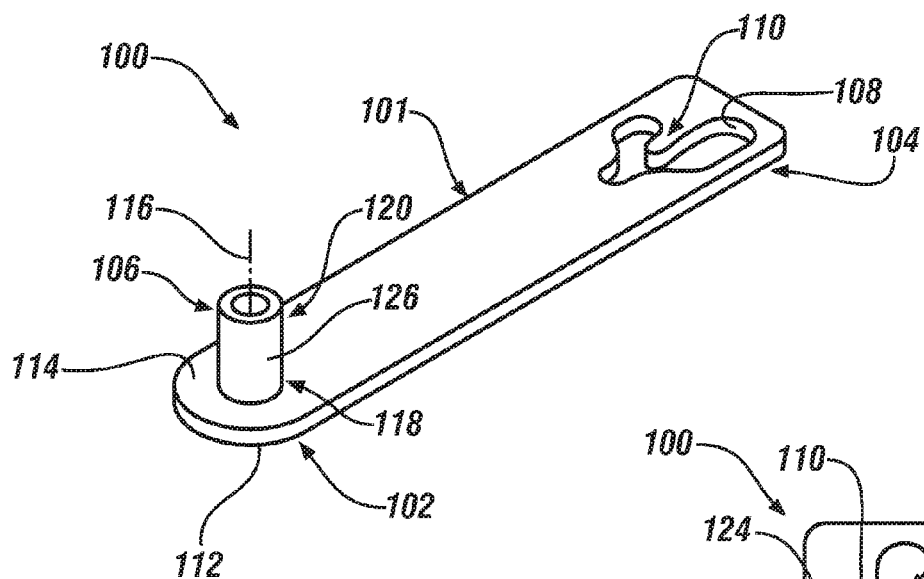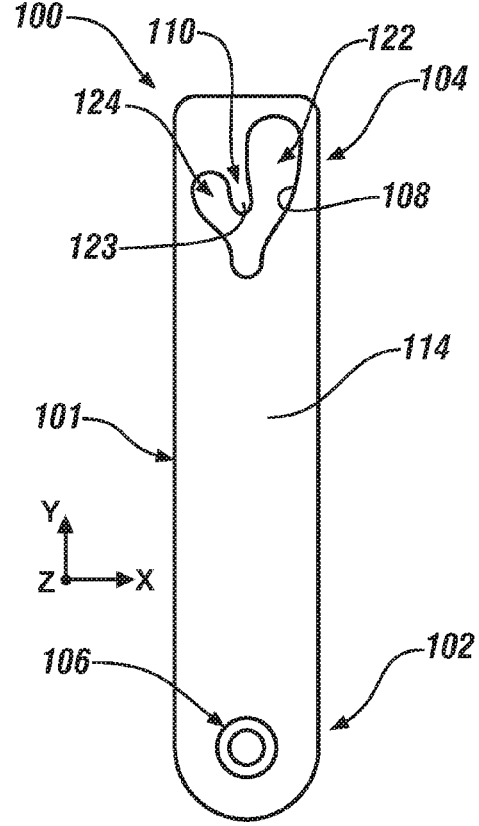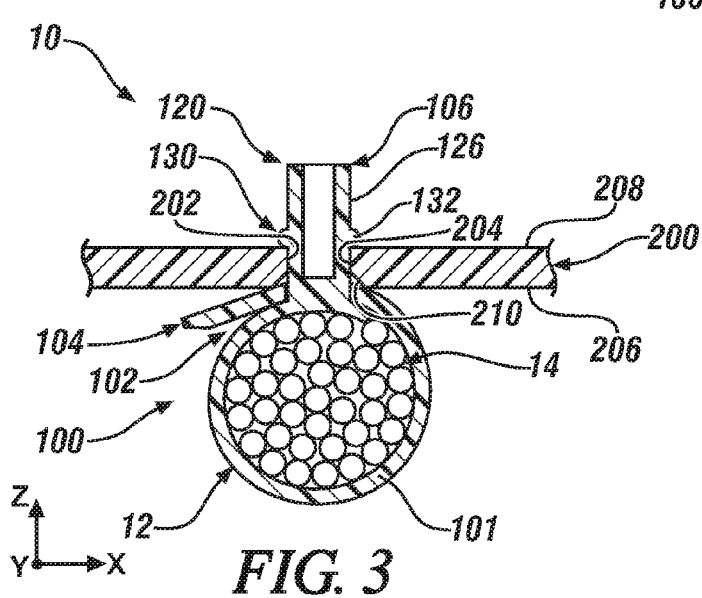

ELASTICALLY AVERAGED STRAP SYSTEMS AND METHODS

FIELD OF THE INVENTION

The subject invention relates to matable components and, more specifically, to elastically averaged matable components for bundling and securing objects.

BACKGROUND

Components, in particular vehicular components used in automotive vehicles, which are to be mated together in a manufacturing process may be mutually located with respect to each other by alignment features that are oversized holes and/or undersized upstanding bosses. Such alignment features are typically sized to provide spacing to freely move the components relative to one another to align them without creating an interference therebetween that would hinder the manufacturing process. One such example includes two-way and/or four-way male alignment features; typically upstanding bosses, which are received into corresponding female alignment features, typically apertures in the form of slots or holes. The components are formed with a predetermined clearance between the male alignment features and their respective female alignment features to match anticipated size and positional variation tolerances of the male and female alignment features that result from manufacturing (or fabrication) variances.

As a result, significant positional variation can occur between two mated components having the aforementioned alignment features, which may contribute to the presence of undesirably large variation in their alignment, particularly with regard to gaps and/or spacing therebetween. In the case where misaligned components are also part of another assembly, such misalignment may also affect the function and/or aesthetic appearance of the entire assembly. Regardless of whether such misalignment is limited to two components or an entire assembly, it can negatively affect function and result in a perception of poor quality. Moreover, clearance between misaligned components may lead to relative motion therebetween, which may cause undesirable noise such as squeaking, rattling, and slapping.

Further, to align and secure components, the aforementioned male and female alignment features may be employed in combination with separate securing features, such as nuts and bolts, snap/push-in fasteners, plastic rivets, and snap rivets, to name a few, that serve to secure the components to each other. In such an assembly, the mating components are located relative to each other by the alignment features, and are fixed relative to each other by the securing features.

Additionally, some vehicles may include components such as wiring, drain hoses, conduit, etc., and it may be desirable to bundle and/or secure such components within the vehicle so they do not get in the way or get damaged. Some known vehicles utilize electrical tape or other similar wrap with x-mas tree-type fasteners to secure these components. For example, x-mas tree or fir tree fastener designs have fingers or tabs extending from a base, and the x-mas tree is pushed in to a component by an operator. Some of the fingers will overlap a mating hole to keep the fastener within the mating hole. However, the base typically has a clearance condition to the mating hole and allows the fastener to move in the hole, resulting in a slipping condition. Additionally, wrap and/or fasteners may become loose and wear out during their life (e.g., adhesive degrades, plastic tabs break off), which may result in component movement and undesirable buzz, squeak, or rattle noises.

SUMMARY OF THE INVENTION

In one aspect, an elastic averaging strap system for securing an object to a component having an aperture is provided. The system includes a strap having a first end and a second end. The strap second end couples to the strap first end such that the strap forms a loop around the object to retain the object therein. An alignment member extends from the first end, and the alignment member is an elastically deformable material such that when the alignment member is inserted into the component aperture, the alignment member elastically deforms to an elastically averaged final configuration to facilitate positioning the object in a desired orientation relative to the component.

In another aspect, a vehicle is provided. The vehicle includes a body having at least one component with an aperture, an object to be secured, and an elastically averaged strap system integrally arranged with the body. The elastically averaged strap system includes a strap having a first end and a second end, wherein the strap second end couples to the strap first end such that the strap forms a loop around the object to retain the object therein. An alignment member extends from the first end, and the alignment member is an elastically deformable material such that when the alignment member is inserted into the component aperture, the alignment member elastically deforms to an elastically averaged final configuration to facilitate positioning the object in a desired orientation relative to the component.

In yet another aspect, a method of manufacturing an elastic averaging strap system for securing an object to a component having an aperture is provided. The method includes forming a strap having a first end and a second end, wherein the strap second end couples to the strap first end such that the strap forms a loop around the object to retain the object therein. The method further includes forming at least one alignment member extending from the first end, and forming the at least one alignment member from an elastically deformable material such that when the alignment member is inserted into the component aperture, the alignment member elastically deforms to an elastically averaged final configuration to facilitate positioning the object in a desired orientation relative to the component.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which:

FIG. 1 is a perspective view of an exemplary elastic averaging strap system;

FIG. 2 is a plan view of the elastic averaging strap system shown in FIG. 1;

FIG. 3 is a cross-sectional view of the elastic averaging strap system shown in FIGS. 1-2 bundling an object and coupled to a component;

DETAILED DESCRIPTION

Figure 4:
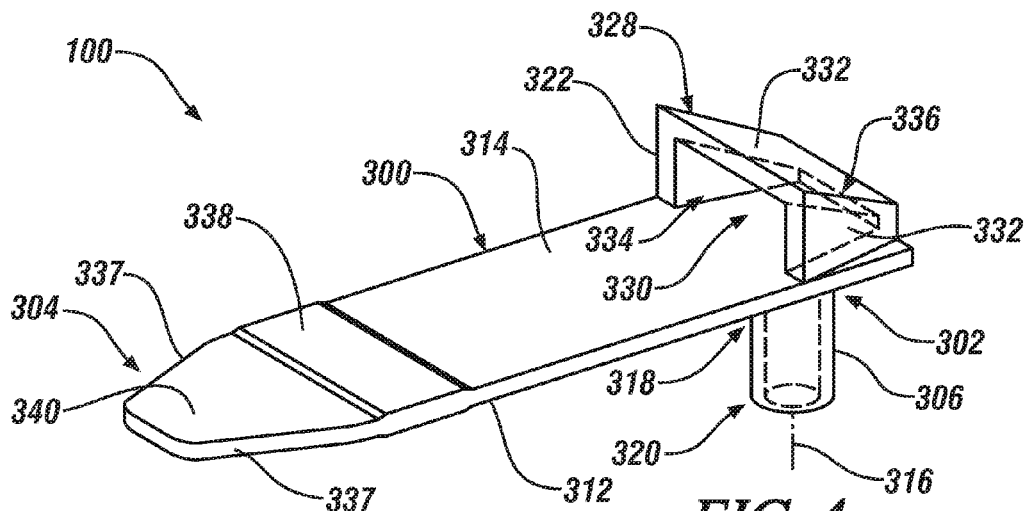
FIG. 4 is a perspective view of another exemplary elastic averaging strap system.

The following description is merely exemplary in nature and is not intended to limit the present disclosure, its application or uses. For example, the embodiments shown are applicable to vehicle components, but the system disclosed herein may be used with any suitable components to provide securement and elastic averaging for precision location and alignment of all manner of mating components and component applications, including many industrial, consumer product (e.g., consumer electronics, various appliances and the like), transportation, energy and aerospace applications, and particularly including many other types of vehicular components and applications, such as various interior, exterior, electrical and under hood vehicular components and applications. It should be understood that throughout the drawings, corresponding reference numerals indicate like or corresponding parts and features.

As used herein, the term "elastically deformable" refers to components, or portions of components, including component features, comprising materials having a generally elastic deformation characteristic, wherein the material is configured to undergo a resiliently reversible change in its shape, size, or both, in response to the application of a force. The force causing the resiliently reversible or elastic deformation of the material may include a tensile, compressive, shear, bending or torsional force, or various combinations of these forces. The elastically deformable materials may exhibit linear elastic deformation, for example that described according to Hooke's law, or non-linear elastic deformation.

Elastic averaging provides elastic deformation of the interface(s) between mated components, wherein the average deformation provides a precise alignment, the manufacturing positional variance being minimized to $X_{min}$, defined by $X_{min}=X/\sqrt{N}$, wherein X is the manufacturing positional variance of the locating features of the mated components and N is the number of features inserted. To obtain elastic averaging, an elastically deformable component is configured to have at least one feature and its contact surface(s) that is over-constrained and provides an interference fit with a mating feature of another component and its contact surface(s). The over-constrained condition and interference fit resiliently reversibly (elastically) deforms at least one of the at least one feature or the mating feature, or both features. The resiliently reversible nature of these features of the components allows repeatable insertion and withdrawal of the components that facilitates their assembly and disassembly. Positional variance of the components may result in varying forces being applied over regions of the contact surfaces that are over-constrained and engaged during insertion of the component in an interference condition. It is to be appreciated that a single inserted component may be elastically averaged with respect to a length of the perimeter of the component. The principles of elastic averaging are described in detail in commonly owned, co-pending U.S. patent application Ser. No. 13/187,675, the disclosure of which is incorporated by reference herein in its entirety. The embodiments disclosed above provide the ability to convert an existing component that is not compatible with the above-described elastic averaging principles, or that would be further aided with the inclusion of a four-way elastic averaging system as herein disclosed, to an assembly that does facilitate elastic averaging and the benefits associated therewith.

Any suitable elastically deformable material may be used for the mating components and alignment features disclosed herein and discussed further below, particularly those materials that are elastically deformable when formed into the features described herein. This includes various metals, polymers, ceramics, inorganic materials or glasses, or composites of any of the aforementioned materials, or any other combinations thereof suitable for a purpose disclosed herein. Many composite materials are envisioned, including various filled polymers, including glass, ceramic, metal and inorganic material filled polymers, particularly glass, metal, ceramic, inorganic or carbon fiber filled polymers. Any suitable filler morphology may be employed, including all shapes and sizes of particulates or fibers. More particularly any suitable type of fiber may be used, including continuous and discontinuous fibers, woven and unwoven cloths, felts or tows, or a combination thereof. Any suitable metal may be used, including various grades and alloys of steel, cast iron, aluminum, magnesium or titanium, or composites thereof, or any other combinations thereof. Polymers may include both thermoplastic polymers or thermoset polymers, or composites thereof, or any other combinations thereof, including a wide variety of co-polymers and polymer blends. In one embodiment, a preferred plastic material is one having elastic properties so as to deform elastically without fracture, as for example, a material comprising an acrylonitrile butadiene styrene (ABS) polymer, and more particularly a polycarbonate ABS polymer blend (PC/ABS). The material may be in any form and formed or manufactured by any suitable process, including stamped or formed metal, composite or other sheets, forgings, extruded parts, pressed parts, castings, or molded parts and the like, to include the deformable features described herein. The elastically deformable alignment features and associated component may be formed in any suitable manner. For example, the elastically deformable alignment features and the associated component may be integrally formed, or they may be formed entirely separately and subsequently attached together. When integrally formed, they may be formed as a single part from a plastic injection molding machine, for example. When formed separately, they may be formed from different materials to provide a predetermined elastic response characteristic, for example. The material, or materials, may be selected to provide a predetermined elastic response characteristic of any or all of the elastically deformable alignment features, the associated component, or the mating component. The predetermined elastic response characteristic may include, for example, a predetermined elastic modulus.

As used herein, the term vehicle is not limited to just an automobile, truck, van or sport utility vehicle, but includes any self-propelled or towed conveyance suitable for transporting a burden.

Described herein are elastic averaging strap systems, as well as methods for elastically averaged strap systems. The strap systems include straps to bundle and secure objects, and include elastically deformable alignment member(s) for coupling the strap system to a component. As such, the systems facilitate securing the objects to another component in a desired orientation and also facilitate precisely aligning the objects, strap system, and/or additional component.

FIGS. 1-3 illustrate an exemplary elastically averaged alignment strap system 10 that generally includes a first component 100 to be mated to a second component 200. Further, first component 100 is configured to form a loop 12 about an object(s) 14 to secure the object(s) to second component 200, as is described herein in more detail. First component 100 includes a strap 101 having a first end 102 and a second end 104. First end 102 includes an elastically deformable alignment member 106, and second end 104 includes an inner wall 108 defining a receiving aperture 110. Alignment member 106 and receiving aperture 110 are fixedly disposed on or formed integrally with first component 100 for proper alignment and orientation when first end 102 is coupled to second end 104 (FIG. 3). Although a single alignment member 106 and receiving aperture 110 are illustrated, component 100 may have any number and combination of corresponding alignment members 102 and receiving apertures 110. Elastically deformable alignment member 106 is configured and disposed to interferingly, deformably, and matingly engage an alignment aperture 204 of second component 200, as discussed herein in more detail, to precisely align first component 100 with second component 200 in two or four directions, such as the +/− x-direction and the +/− y-direction of an orthogonal coordinate system, for example, which is herein referred to as two-way and four-way alignment.

In the exemplary embodiment, first component 100 generally includes an outer face 112 and an inner face 114 from which alignment member 106 extends. Alignment member 106 is a generally circular hollow tube having a central axis 116, a proximal end 118 coupled to inner face 114, and a distal end 120. However, alignment member 106 may have any cross-sectional shape that enables system 10 to function as described herein. In the exemplary embodiment, first component 100 is fabricated from a material such as plastic. However, first component 100 may be fabricated from any suitable material that enables system 10 to function as described herein.

In the exemplary embodiment, receiving aperture 110 includes an insertion portion 122 and a locking portion 124. Insertion portion 122 has a cross-sectional shape that is larger than a cross-sectional shape of alignment member 106, and locking portion 124 has a cross-sectional shape that is smaller than the cross-sectional shape of alignment member 106. Further, a deformable member 123 is located between insertion portion 122 and locking portion 124. As such, strap first end 102 is looped toward strap second end 104 such that alignment member 106 is inserted into insertion portion 122 (FIG. 3). Strap 101 is subsequently manipulated such that alignment member 106 is transferred from the insertion portion 122 into deforming deformable member 123. Deformable member 123 at least partially deforms and alignment member 106 is moved into the locking portion 124 to thereby secure alignment member 106 within receiving aperture 110. Accordingly, first component 100 forms loop 12, which may be wrapped about or receive object 14 for securement within loop 12.

Second component 200 generally includes an inner wall 202 defining alignment aperture 204, an outer face 206, and an inner face 208. In the exemplary embodiment, alignment aperture 204 is illustrated as having a generally circular cross-section. Alternatively, alignment aperture 204 may have any shape that enables system 10 to function as described herein. For example, alignment aperture 204 may be an elongated slot (e.g., similar to the shape of elastic tube alignment system described in co-pending U.S. patent application Ser. No. 13/187,675 and particularly illustrated in FIG. 13 of the same). In the exemplary embodiment, second component 200 is fabricated from a rigid material such as sheet metal. However, second component 200 may be fabricated from any suitable material that enables system 10 to function as described herein.

While not being limited to any particular structure, object 14 may be a bundle of wires 16, and second component 200 may be a supporting substructure that is part of, or is attached to, a vehicle and on which first component 100 is fixedly mounted in precise alignment. However, first component 100 may wrap about or receive any suitable object. For example, object 14 may be a drain hose, a conduit, a portion of an airbag, an airbag inflator cylinder, under hood components, electrical wiring, etc. Further, second component 200 may be any suitable component that object 14 can be secured to.

To provide an arrangement where elastically deformable alignment member 106 is configured and disposed to interferingly, deformably and matingly engage alignment aperture 204, the diameter of alignment aperture 204 is less than the diameter of alignment member 106, which necessarily creates a purposeful interference fit between the elastically deformable alignment member 106 and alignment aperture 204. Further, second component 200 may include a chamfer 210 to facilitate insertion of alignment member 106. As such, when inserted into alignment aperture 204, portions of the elastically deformable alignment member 106 elastically deform to an elastically averaged final configuration that aligns alignment member 106 with the alignment aperture 204 in four planar orthogonal directions (the +/− x-direction and the +/− y-direction). Where alignment aperture 204 is an elongated slot (not shown), alignment member 106 is aligned in two planar orthogonal directions (the +/− x-direction or the +/− y-direction).

As shown in FIG. 3, alignment member 102 may include one or more retention features 130 to facilitate retention of alignment member 102 within alignment aperture 204. In the exemplary embodiment, retention feature 130 is a lip or rib 132 extending from an outer wall 126 of alignment member 106 proximate distal end 120. Rib 132 extends at least partially about the circumference of outer wall 126 and is configured to engage outer face 208 and/or inner wall 202. For example, retention rib 132 interferingly engages outer face 208 to increase the amount of force required to disengage or otherwise back-out alignment member 106 from within alignment aperture 204. Alternatively, retention feature 130 may have any suitable shape that enables system 10 to function as described herein. For example, retention feature may be a notch or indentation (not shown) formed in outer wall 126 and configured to receive and engage at least a portion of second component 200. Accordingly, retention features 130 facilitate improved retention of alignment member 106 within alignment aperture 206.

While FIG. 3 depicts a single elastically deformable alignment member 106 in a corresponding alignment aperture 204 to provide four-way alignment of first component 100 relative to second component 200, it will be appreciated that the scope of invention is not so limited and encompasses other quantities and types of elastically deformable alignment elements used in conjunction with the elastically deformable alignment member 10 and corresponding alignment aperture 204. For example, component 100 may be wider and include three pairs of corresponding alignment members 102 and receiving apertures 110 to secure a longer section of object(s) 14.

Figure 5:
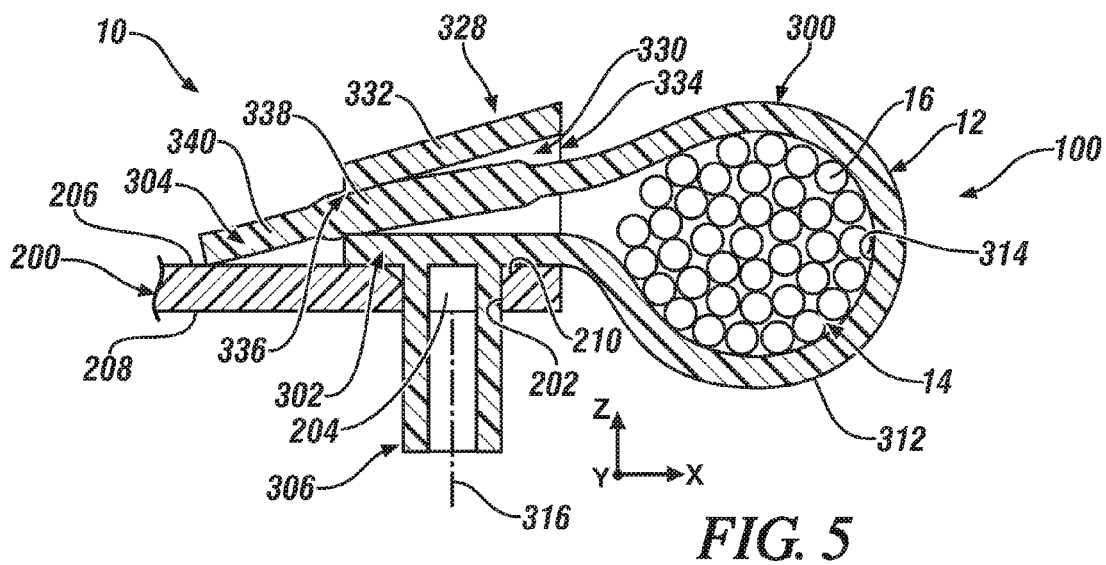
FIG. 5 is a cross-sectional view of the elastic averaging strap system shown in FIG. 4 bundling an object and coupled to a component.

FIGS. 4 and 5 illustrate an alternative embodiment of first component 100. In the exemplary embodiment, first component 100 includes a strap 300 having a first end 302 and a second end 304. First end 302 includes an elastically deformable alignment member 306 and a receiving member 328 defining a receiving slot 330. Alignment member 306 and receiving member 328 are fixedly disposed on or formed integrally with first component 100 for proper alignment and orientation when second end 304 is coupled to first end 302 (FIG. 5). Although a single alignment member 306 is illustrated, component 100 may have any number of alignment members 306. Elastically deformable alignment member 306 is configured and disposed to interferingly, deformably, and matingly engage alignment aperture 204 of second component 200, as discussed herein in more detail, to precisely align first component 100 with second component 200 in two or four directions.

In the exemplary embodiment, first component 100 generally includes an outer face 312 from which alignment member 306 extends, and an inner face 314 from which receiving member 328 extends. Alignment member 306 is a generally circular hollow tube having a central axis 316, a proximal end 318 coupled to outer face 312, and a distal end 320. However, alignment member 306 may have any cross-sectional shape that enables system 10 to function as described herein. In the exemplary embodiment, first component 100 is fabricated from more than one material. For example, first end 302 is fabricated from a rigid material such as plastic, and second end 304 is fabricated from a flexible material such as rubber. However, first component 100 may be fabricated from any suitable material that enables system 10 to function as described herein.

In the exemplary embodiment, receiving member 328 includes converging walls 332 that at least partially define receiving slot 330. As such, receiving slot includes a first end 334 that has a larger cross-section than a second end 336. Alternatively, receiving member 328 may have any suitable converging shape such as, for example, a substantially conical shape. Strap second end 304 may include an enlarged portion 338 that has a cross-section that is larger than the cross-section of slot second end 336; whereas a portion 340 of second end 304 has a cross-section smaller than the cross-section of slot second end 336. Accordingly, when strap second end 304 is looped toward strap first end 302, such that portion 340 is inserted into receiving slot 330 and through slot second end 336, enlarged portion 338 will cause interference with slot second end 336. Moreover, as shown, strap second end 304 may have tapered lead-in edges 337 to facilitate insertion into receiving slot 330. In the exemplary embodiment, strap second end 304 is subsequently stretched (due to its material properties) to reduce the size of the cross-section of enlarged portion 338, which enables enlarged portion to pass through receiving slot 330. The stretching force on strap second end 304 is then removed and strap second end 304 returns to its original shape and enlarged portion 338 again has a cross-section that is larger than slot second end 336, thereby securing object 14 within loop 12 and preventing strap second end 304 from backing out of or removed from receiving member 328, FIG. 5. However, the strap second end 304 may be configured to release and back out of receiving member upon application of a predetermined force. For example, loop 12 may secure an airbag (not shown) and upon airbag inflation, the expansion force pulls strap second end 304 back through receiving member 328 and first component 100 subsequently releases the airbag. Alternatively, strap 300 may have a cross-section larger than the cross-section of slot second end 336, and strap 300 may similarly be stretched to reduce the size of the cross-section of strap 300, which enables a portion of strap 300 to pass through receiving slot 330. Accordingly, a desired length of strap second end 304 may be inserted through receiving slot 300 to conform to and secure varying sized object(s) 14.

To provide an arrangement where elastically deformable alignment member 306 is configured and disposed to interferingly, deformably and matingly engage alignment aperture 204, the diameter of alignment aperture 204 is less than the diameter of alignment member 306, which necessarily creates a purposeful interference fit between the elastically deformable alignment member 306 and alignment aperture 204. Further, chamfer 210 may be formed to facilitate insertion of alignment member 306. As such, when inserted into alignment aperture 204, portions of the elastically deformable alignment member 306 elastically deform to an elastically averaged final configuration that aligns alignment member 306 with the alignment aperture 204 in four planar orthogonal directions (the +/− x-direction and the +/− y-direction). Where alignment aperture 204 is an elongated slot (not shown), alignment member 306 is aligned in two planar orthogonal directions (the +/− x-direction or the +/− y-direction). Further, alignment member 306 may also include one or more retention feature 130 described herein.

Figure 6:
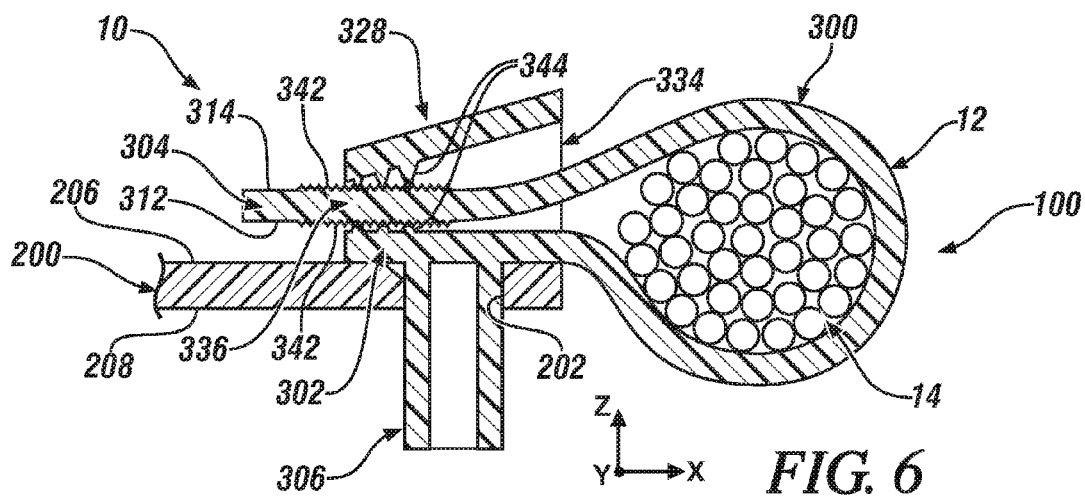
FIG. 6 is a cross-sectional view of portions of the strap system shown in FIGS. 4-5 and with alternative features.

As shown in FIG. 6, strap 300 may alternatively exclude enlarged portion 338 and may include a plurality of teeth 342 formed on outer face 312 and/or inner face 314. Teeth 342 are shaped to enable strap second end 304 to be inserted into receiving member 328 from slot first end 334, but facilitate preventing strap second end 304 from being pulled back out of receiving slot 330 in a direction from slot second end 336 to slot first end 334. Moreover, receiving member 328 may include one or more serrations or notches 344 to engage teeth 342 to facilitate preventing removal of strap second end 304 from receiving member 328, yet enable insertion therein.

Figure 7:
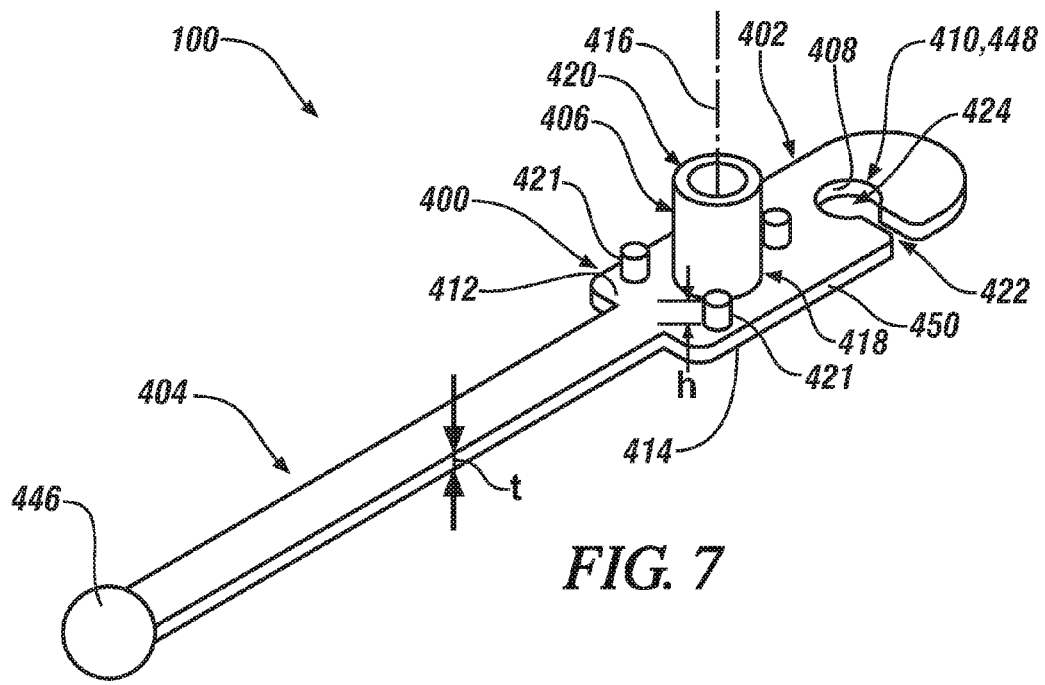
FIG. 7 is a perspective view of yet another exemplary elastic averaging strap system.
Figure 8:
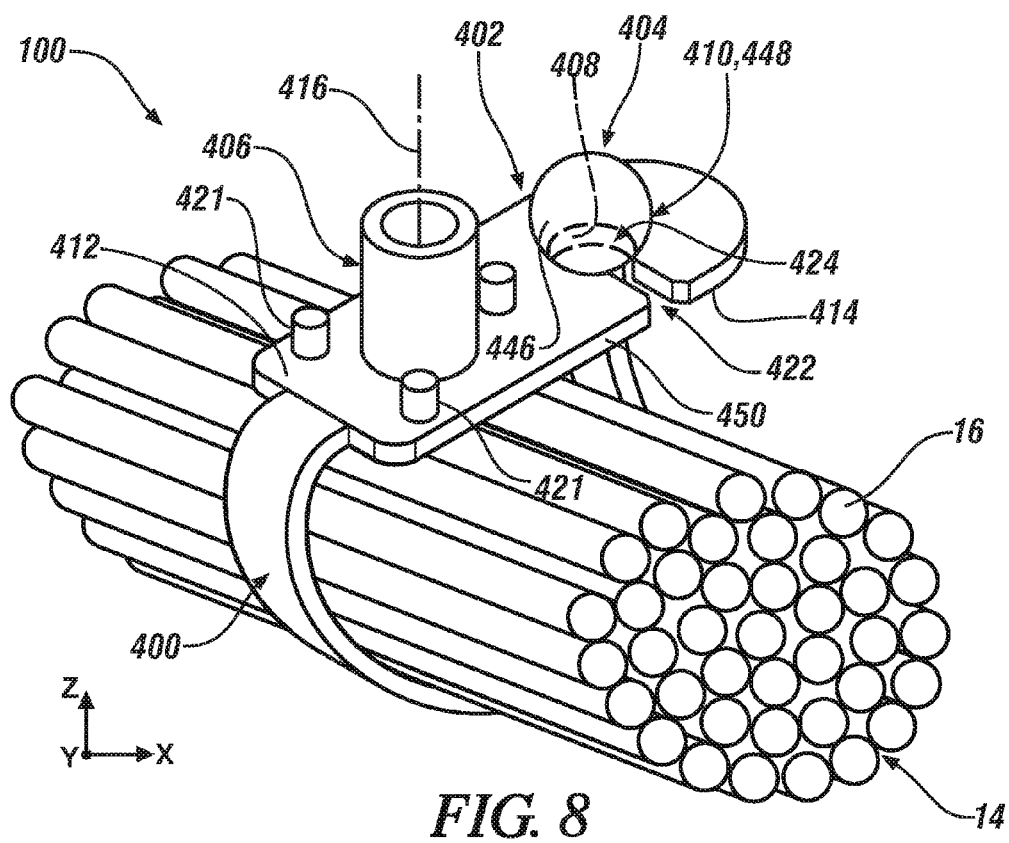
FIG. 8 is a cross-sectional view of the elastic averaging strap system shown in FIG. 7.
Figure 9:
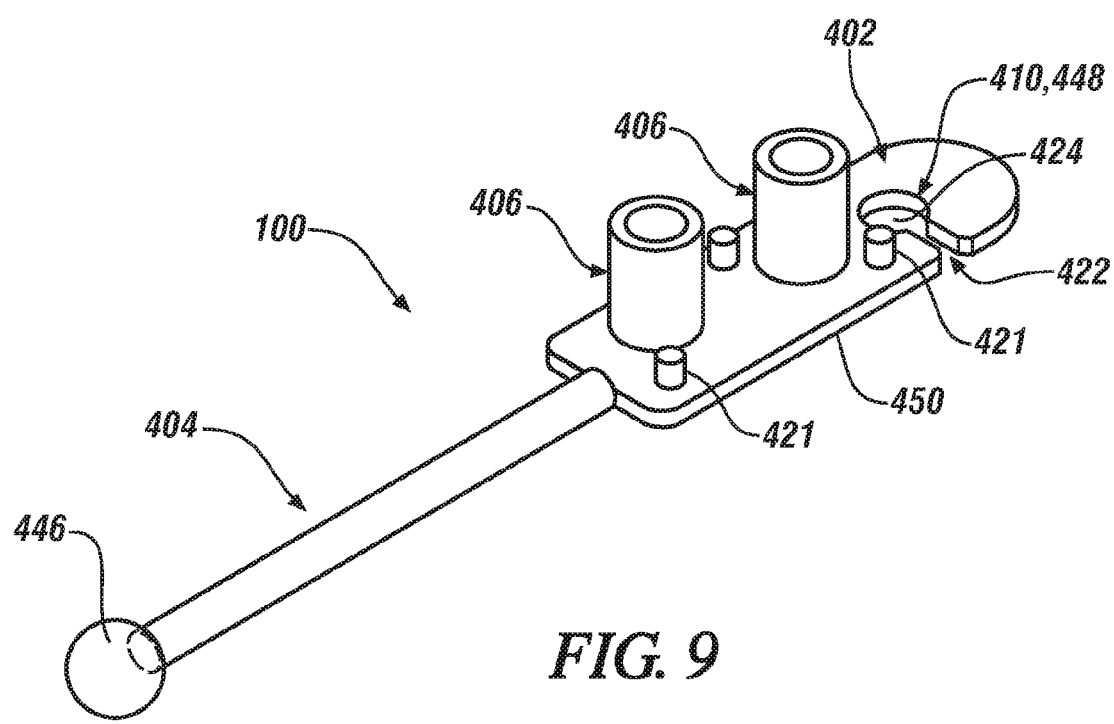
FIG. 9 is a perspective view of yet another exemplary elastic averaging strap system.

FIGS. 7 and 8 illustrate an alternative embodiment of first component 100. In the exemplary embodiment, the first component includes a strap 400 having a first end 402 and a second end 404. First end 402 includes an elastically deformable alignment member 406 and an inner wall 408 defining a receiving aperture 410, and second end 404 includes an end knob 446. Alignment member 406 and receiving aperture 410 are fixedly disposed on or formed integrally with first component 100 for proper alignment and orientation when second end 404 is coupled to first end 402 (FIG. 8). Elastically deformable alignment member 406 is configured and disposed to interferingly, deformably, and matingly engage an alignment aperture 204 of second component 200, as discussed herein in more detail, to precisely align first component 100 with second component 200 in two or four directions. Although a single alignment member 406 is illustrated, component 100 may have any number of alignment members 406. For example, as shown in FIG. 9, first component 100 may include two alignment members 406 and may include a cylindrical or tubular second end 404.

In the exemplary embodiment, first component 100 generally includes an outer face 412 from which alignment member 406 extends, and an inner face 414. Alignment member 406 is a generally circular hollow tube having a central axis 416, a proximal end 418 coupled to outer face 412, and a distal end 420. However, alignment member 406 may have any cross-sectional shape that enables system 10 to function as described herein. In the exemplary embodiment, first component 100 is fabricated from more than one material. For example, first end 402 is fabricated from a rigid material such as plastic, and second end 404 is fabricated from a flexible material such as rubber. However, first component 100 may be fabricated from any suitable material that enables system 10 to function as described herein.

Moreover, one or more standoffs 421 may be spaced relative to alignment member 406 such that they provide a support platform at a height "h" above first component outer face 412 upon which second component inner face 206 rests when elastically deformable alignment member 406 is configured and disposed to interferingly, deformably and matingly engage alignment aperture 204. Stated alternatively, standoffs 421 are disposed and configured to provide a point of engagement between alignment aperture 204 and elastically deformable alignment member 406 at an elevation "h" above the base, outer face 412, of elastically deformable alignment member 406. While FIGS. 7-9 depict standoffs 421 in the form of posts at a height "h" relative to first component outer face 412, it will be appreciated that the scope of the invention is not so limited and also encompasses other numbers and shapes of standoffs 421 suitable for a purpose disclosed herein, and also encompasses a standoff in the form of a continuous ring disposed around alignment member 406. All such alternative standoff arrangements are contemplated and considered within the scope of the invention disclosed herein. Moreover, while FIGS. 7-9 depict standoffs 421 integrally formed on outer face 412, it will be appreciated that a similar function may be achieved by integrally forming standoffs 421 on second component outer face 206, which is herein contemplated and considered to be within the scope of the invention disclosed herein. Alternatively, system 10 may not include standoffs.

In the exemplary embodiment, receiving aperture 410 is a keyhole 448 that extends through an edge 450 of strap first end 402. Receiving aperture 410 includes an insertion portion 422 and a locking portion 424. Insertion portion 422 has a cross-sectional shape that is smaller than a thickness "t" of strap second end 404, and locking portion 424 has a cross-sectional shape that is smaller than the cross-sectional shape of end knob 446. As such, strap second end 404 is looped toward strap first end 402, and strap second end 404 is subsequently stretched (due to its material properties) to reduce the thickness of strap second end 404 proximate end knob 446, which enables the stretched portion to pass through insertion portion 422 to locking portion 424. The stretching force on strap second end 404 is then removed and strap second end 404 returns to its original shape, thereby preventing strap second end 404 from passing back through insertion portion 422. Moreover, because the cross-section of end knob 446 is larger than the cross-section of locking portion 424, strap second end 404 is also prevented from backing out of receiving aperture 410, which secures object 14 within loop 12. Alternatively, strap second end 404 may be tubular and have a cross-section that is larger than both insertion portion 422 and locking portion 424. Similarly, when stretched, the cross-section of strap second end 404 becomes smaller and may be inserted through insertion portion 422 and into locking portion 424, where the cross-section of strap second end 404 returns to its original shape to secure strap second end 404 within locking portion 424. Accordingly, a desired length of strap second end 404 may be inserted into locking portion 424 to conform to and secure varying sized object(s) 14.

To provide an arrangement where elastically deformable alignment member 406 is configured and disposed to interferingly, deformably and matingly engage alignment aperture 204 (e.g., as seen in FIG. 3), the diameter of alignment aperture 204 is less than the diameter of alignment member 406, which necessarily creates a purposeful interference fit between the elastically deformable alignment member 406 and alignment aperture 204. Further, second component 200 may include chamfer 210 to facilitate insertion of alignment member 406. As such, when inserted into alignment aperture 204, portions of the elastically deformable alignment member 406 elastically deform to an elastically averaged final configuration that aligns alignment member 406 with the alignment aperture 204 in four planar orthogonal directions (the +/− x-direction and the +/− y-direction). Where alignment aperture 204 is an elongated slot (not shown), alignment member 406 is aligned in two planar orthogonal directions (the +/− x-direction or the +/− y-direction). Further, alignment member 406 may also include one or more retention features 130 described herein.

An exemplary method of fabricating elastically averaged strap and alignment system 10 includes forming first component 100 to include a strap 101, 300, 400 with first end 102, 302, 402 and second end 104, 304, 404 such that the strap second end couples to the strap first end to form loop 12, which may retain object(s) 14. At least one alignment member 106, 306, 406 is formed extending from strap first end 102, 302, 402, and the at least one alignment member is formed from an elastically deformable material such that when the alignment member is inserted into second component aperture 204, the at least one alignment member elastically deforms to an elastically averaged final configuration to facilitate securing and positioning object 14 in a desired orientation relative to second component 200.

In one embodiment, strap 101 is formed with inner wall 108 defining receiving aperture 110, which includes insertion portion 122 and locking portion 124. In another embodiment, strap 300 is formed with receiving member 328 on an opposite side of strap 300 from alignment member 306. Receiving member 328 includes converging walls 332 that define receiving slot 330 and slot first end 334, which is larger than opposed slot second end 336. Strap second end 304 may be formed with enlarged portion 338, strap second end 304 may be formed with teeth 342, and/or receiving member 328 may be formed with notches 344. In yet another embodiment, strap first end 402 is formed with inner wall 408 defining receiving aperture 410, and strap second end 404 is formed with end knob 446.

Systems and methods for elastically averaged strap assemblies are described herein. The systems generally include a first component with an elastically deformable alignment member positioned for insertion into an alignment aperture of a second component. The mating of the first and second components is elastically averaged over each pair of corresponding alignment member and alignment aperture to precisely mate the components in a desired orientation. Moreover, the systems include a strap that forms a loop around an object to retain that object and to secure the object to the second component. Accordingly, the described systems facilitate grouping or bundling a plurality of objects and/or securing an object so that they not get in the way of other components.

Moreover, the various embodiments of system 10 and first component straps 101, 300, 400 may be used as temporary hangers. For example, an air bag inflator module could be temporarily attached to a component and stay in position until fasteners permanently attach the module thereto. However, system 10 and/or first component straps 101, 300, 400 may be used to temporarily or permanently secure objects in many other applications. Further, system 10 and/or first component straps 101, 300, 400 may be used to replace damaged fasteners such as damaged x-mas tree type-fasteners or rubber bands.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An elastic averaging strap system for securing an object to a component having an aperture, the system comprising:
   a strap having a first end and a second end, wherein the strap second end couples to the strap first end such that the strap forms a loop around the object to retain the object therein;
   an alignment member extending from the first end, wherein the alignment member is an elastically deformable material such that when the alignment member is inserted into the component aperture, the alignment member elastically deforms to an elastically averaged final configuration to facilitate positioning the object in a desired orientation relative to the component; and
   a receiving member extending from the strap first end and defining a receiving slot, the receiving slot configured to receive and secure the strap second end to form the loop surrounding the object, wherein the strap second end is fabricated from an elastic material and at least a portion of the strap second end has a cross-section larger than a cross-section of the receiving slot, the strap second end configured to be stretched by a force such that the second end large cross-section is reduced for insertion through the receiving slot and the large cross-section expands after insertion through the receiving slot and removal of the stretching force to secure the strap within the receiving member.

2. The system of claim 1, wherein the second end includes an inner wall defining a receiving aperture, the receiving aperture configured to receive and secure the alignment member to form the loop around the object.

3. The system of claim 2, wherein the receiving aperture comprises an insertion portion and a locking portion, the alignment member configured to be inserted into the insertion portion and translated to the locking portion to secure the alignment member within the receiving aperture.

4. The system of claim 1, wherein the strap is fabricated from plastic.

5. The system of claim 1, wherein the alignment member comprises an outer wall having a retention feature configured to engage the component and facilitate preventing the alignment member from backing out of the component aperture after insertion therein.

6. The system of claim 5, wherein the retention feature comprises at least one of a rib extending from the outer wall and a notch formed in the outer wall.

7. The system of claim 1, wherein the receiving member is substantially conical.

8. The system of claim 1, wherein the strap first end and the receiving member are fabricated from a different material than the strap second end.

9. The system of claim 1, wherein the strap second end comprises a plurality of teeth, the teeth configured for insertion into the receiving slot and interference with the receiving member to facilitate preventing the strap second end from backing out of the receiving slot after insertion therein.

10. The system of claim 9, wherein the receiving member includes a plurality of notches configured to engage the teeth.

11. An elastic averaging strap system for securing an object to a component having an aperture, the system comprising:
    a strap having a first end and a second end, wherein the strap second end couples to the strap first end such that the strap forms a loop around the object to retain the object therein; and
    an alignment member extending from the first end, wherein the alignment member is an elastically deformable material such that when the alignment member is inserted into the component aperture, the alignment member elastically deforms to an elastically averaged final configuration to facilitate positioning the object in a desired orientation relative to the component, wherein the strap first end includes an inner wall defining a receiving aperture, the receiving aperture configured to receive and secure the strap second end to form the loop around the object, wherein the strap first end is fabricated from a first material and the second strap is fabricated from a second material, wherein the first material is less flexible than the second material.

12. The system of claim 11, wherein the receiving aperture is a keyhole slot formed in an edge of the strap first end, the strap second end configured to be stretched by a force and inserted into the keyhole from the strap edge, and expanding after insertion into the keyhole and removal of the stretching force to secure the strap second end to the strap first end.

13. The system of claim 12, wherein the strap second end includes a knob having a cross-section larger than a cross-section of the keyhole.

* * * * *